No. 770,718. Patented September 20, 1904.

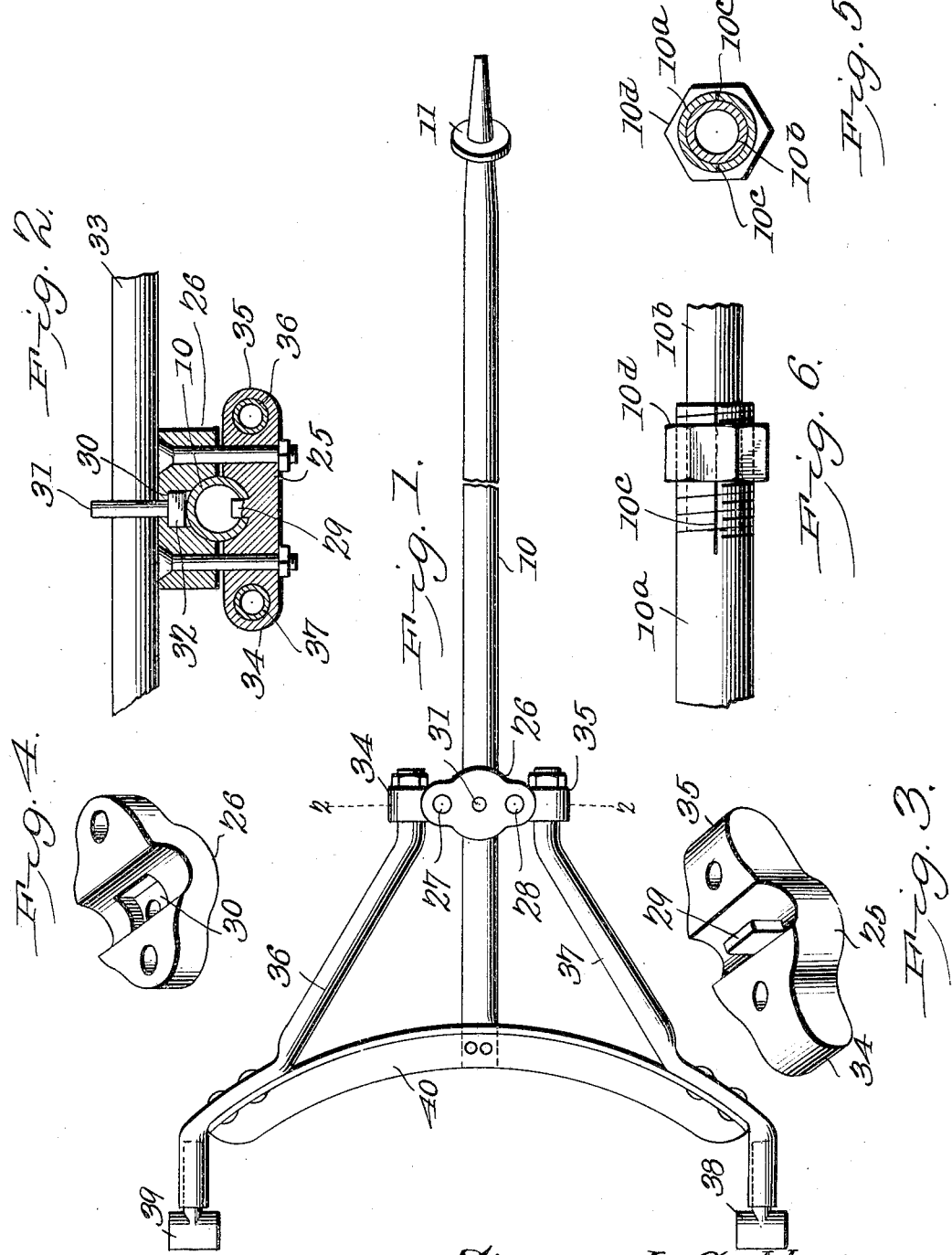

UNITED STATES PATENT OFFICE.

SIMPSON L. GEDDES AND ELMER GEORGE O'BRIEN, OF WELLINGTON, KANSAS.

VEHICLE-TONGUE CONSTRUCTION.

SPECIFICATION forming part of Letters Patent No. 770,718, dated September 20, 1904.

Application filed August 6, 1903. Renewed July 29, 1904. Serial No. 218,675. (No model.)

*To all whom it may concern:*

Be it known that we, SIMPSON L. GEDDES and ELMER GEORGE O'BRIEN, citizens of the United States, residing at Wellington, in the county of Sumner and State of Kansas, have invented a new and useful Vehicle-Tongue Construction, of which the following is a specification.

This invention relates to the construction of tongues of vehicles, and has for its object to simplify and improve devices of this class and produce a strong and rigid structure combining lightness and strength, together with cheapness of construction and durability.

The invention consists in certain novel features of construction, as hereinafter shown and described, and specified in the claims.

In the drawings illustrative of the invention, in which corresponding parts are denoted by like designating characters, Figure 1 is a plan view of the improved device embodied in a vehicle-tongue structure. Fig. 2 is a detail view illustrating the structure applied to the tongue of a vehicle. Fig. 3 is a detail view of one of the clip members. Fig. 4 is a detail view of the opposing clip member. Fig. 5 is a cross-sectional view through the telescoping members of the pole, and Fig. 6 is a fragmentary view of the telescoping members of the pole and the nut in elevation.

In the improved structure the tongue member is formed of a continuous integral tube, as indicated at 10 in Fig. 1, or it may consist of two telescoping sections, as indicated at $10^a$ and $10^b$ in Figs. 5 and 6. In the latter case one of the sections will be split, as at $10^c$, to receive the end of the other section, which can be clamped thereon by the nut $10^d$. The member 10 will be modified as to length and diameter to adapt it to the vehicle to which it is attached and will be provided at the forward end with the usual flanges or other means 11 for supporting the neck-yoke or other means for coupling to the harness. The tongue member 10 will be disposed centrally of the line of travel of the vehicle and provided with spaced clip members 25 26, clamped thereto, as by rivets or bolts 27 28. Formed in the bottom of the tongue member 10, opposite the clip member 25, is an aperture into which a stud 29, rising from the member 25, protrudes to increase the "grip" of the clip members and prevent longitudinal movement of the member 10. Formed in the upper clip member 26 is a central aperture 30, enlarged at its inner end and adapted to support a pivot-pin 31, having an enlarged head 32, and resting by said enlarged head upon the member 10, as shown. The bolt or pin 31 forms the pivot for the doubletree 33, which is preferably tubular to combine strength and lightness. By this simple means the doubletree is firmly supported in position while at the same time left free to swing upon its pivot. The clip member 25 is extended laterally of the member 10, as at 34 35, and in these extended ends brace members 36 37 are secured, as by riveting and extending outwardly and rearwardly and terminating in T-heads 38 39, by which they may be coupled to the running-gear of a vehicle in the ordinary manner. The member 10 extends rearwardly of the clip members 25 26 and is connected by a transverse bar 40 to the brace members 36 37, as by riveting, as shown. The brace members 36 37 are preferably tubular, and the bar 40 is preferably L-shaped in transverse section. By this simple means a very strong, durable, and relatively light structure is produced which may be readily adapted to all the different styles of vehicles. The parts will preferably be of tubular steel; but other metal may be employed, if preferred.

The dimensions and proportions may be altered and modified in minor particulars without departing from the principle of the invention or sacrificing any of its advantages.

Having thus described our invention, what we claim is—

1. In a vehicle tongue or shaft structure a continuous tubular member having an aperture in one side, a clip member formed in two parts embracing opposite sides of said tubular member and clamped thereto, one of said clip members having an internal stud engaging said aperture, oppositely-extending brace members connected by one end to said clip and adapted for connection at their free ends to the running-gear of a vehicle, and a transverse brace member connecting said brace members and the rear end of said tubular member, substantially as described.

2. In a vehicle tongue or shaft structure a continuous central member, a clip member formed in two parts and coupled to said central member, one of said clip members having a central aperture enlarged at the inner end, a pivot-bolt for the doubletree having an enlarged head engaging said aperture and supported in place by contact with said central member, brace members connected to said clip members and means for coupling said brace members to the running-gear of a vehicle, substantially as described.

In testimony that we claim the foregoing as our own we have hereto affixed our signatures in the presence of two witnesses.

SIMPSON L. GEDDES.
   ELMER GEORGE O'BRIEN.

Witnesses:
 J. P. WIMER,
 F. B. STUMP.